United States Patent [19]
Ott et al.

[11] 4,009,227
[45] Feb. 22, 1977

[54] ABS MOULDING COMPOSITIONS

[75] Inventors: Karl-Heinz Ott, Leverkusen; Harry Rohr, Gross Koenigsdorf; Gert Humme, Leverkusen; Leo Morbitzer, Cologne, all of Germany

[73] Assignee: Bayer Aktiengesellschaft, Germany

[22] Filed: Apr. 22, 1975

[21] Appl. No.: 570,996

[30] Foreign Application Priority Data

Apr. 26, 1974 Germany .......................... 2420357

[52] U.S. Cl. .......................... 260/876 R; 260/880 R
[51] Int. Cl.² .......................................... C08L 55/02
[58] Field of Search ................................. 260/876 R

[56] References Cited
UNITED STATES PATENTS 3,509,237  4/1970  Aubrey et al. .................. 260/280
3,509,238  4/1970  Aubrey et al. .................. 260/876 R Primary Examiner—Carman J. Seccuro
Attorney, Agent, or Firm—Connolly and Hutz

[57] ABSTRACT

Moulding compositions based on ABS-graft polymers, containing:

A. 5 to 70 parts, by weight of a graft polymer obtained by grafting 20 to 60 parts by weight of a mixture of styrene and acrylonitrile in a ratio, by weight, of 95 : 5 to 60 : 40 onto 80 to 40 parts, by weight, of polybutadiene or a butadiene copolymer with a butadiene content of > 30% with an average particle diameter of 0.26 to 0.65 $\mu$ and a grafting degree of 0.15 to 0.7;

B. 0 to 50 parts, by weight, of a graft polymer obtained by polymerizing 40 to 60 parts, by weight, of a mixture of styrene and acrylonitrile in a ratio, by weight, of 95 : 5 to 60 : 40 onto 60 to 40 parts, by weight, of polybutadiene or a butadiene copolymer with a butadiene content of more than 30%, with an average particle diameter of from 0.05 to 0.25 $\mu$ and a grafting degree of 0.4 to 0.9; and C. 25 to 95 parts, by weight, of a copolymer of styrene and/or $\alpha$-methyl styrene on the one hand and acrylonitrile on the other hand in a ratio by weight, of 80 : 20 to 60 : 40 with an average molecular weight $M_w$ (weight average) of from 50,000 to 200,000 and a molecular heterogeneity U of 4.5 to 1.0; such that D. the ratios, by weight, of styrene (including $\alpha$-methyl styrene if present) to acrylonitrile satisfy the following conditions:

$$\frac{\text{polymerised styrene in (A)}}{\text{polymerised acrylonitrile in (A)}} :$$

$$\frac{\text{polymerised styrene in (C)}}{\text{polymerised acrylonitrile in (C)}} > 1$$

and $$\frac{\text{polymerised styrene in (B)}}{\text{polymerised acrylonitrile in (B)}} :$$

$$\frac{\text{polymerised styrene in (A)}}{\text{polymerised acrylonitrile in (A)}} < 1$$

8 Claims, No Drawings

ABS MOULDING COMPOSITIONS

This invention relates to thermoplastic moulding compositions of the ABS-type with improved properties as compared to known ABS-moulding compositions, more especially greater toughness, a higher surface gloss and easier processibility.

The name ABS derives from the monomers acrylonitrile, butadiene and styrene of which these moulding compositions are basically made.

ABS-moulding compositions are two-phase plastics; they constitute a microheterogeneous polymer mixture. An elastomeric material based on butadiene, styrene and/or acrylonitrile is dispersed as inner discontinuous phase in a thermoplastic styrene-acrylonitrile copolymer as matrix, hereinafter also referred to as resin matrix, SAN-resin or SAN-matrix. In principle, saturated elastomeric components may also serve as the inner phase, providing certain compatibility requirements are satisfied.

Where the inner phase is a graft polymer of styrene and acrylonitrile (graft monomer) on a butadiene homo- or co-polymer (spine) the graft polymers in question are ABS-graft polymers.

The physical properties of ABS-graft polymers are only partially derived from the properties of their polymer components. The most important properties derive from the two-phase structure consisting of a rubber phase embedded in a hard and brittle thermoplastic matrix.

For example, toughness and surface gloss are inversely influenced by particle size and structure of the rubber phase and the quantity in which it is present in the moulding composition. If an ABS-graft polymer with a grafting degree [2] G of $\geq 0.6$ (G-value; "actual grafting degree") for an average particle diameter [1] of $0.1\mu$, is dispersed in the resin matrix, the moulding composition obtained is of moderate toughness but of high surface gloss, irrespective of its ABS-graft polymer content (and hence its rubber content).

[1] Ultracentrifuge measurements (cf. W. Scholtan, H. Lange; Kolloid. Z. und Z. Polymer 250 (1972) 782 to 796) or measurements by electron microscopy, followed by particle counting (cf. G. Kämpf, H. Schuster; Angew. Makromol. Chemie 14 (1970) 111 to 129). Particle diameter always means the $d_{50}$-value.

[2] The grafting degree G (G-value) is the ratio $\frac{\text{"SAN" grafted}}{\text{spine}}$; a dimensionless number.

With a grafting degree G of the graft polymer of 0.2, the moulding composition obtained has toughness but a dull surface because the ABS-graft polymer particles with an incomplete grafting shell agglomerate during thermoplastic processing to form particles with a diameter of $\geq 1.0\ \mu$, so that the surface of the moulding shows macroscopic irregularities which scatter light to a considerable extent and, hence, appear dull.

With average particle diameters of from 0.35 to 0.65 $\mu$, it is possible to establish a compromise between toughness and surface gloss then the ABS-graft polymers have a G-value of from 0.20 to 0.7. Since the particle diameters are still above half the wave length of visible light, the scattering effects which occur are greater than in the case of ABS-graft polymers whose inner phase has an average particle diameter of, for example, 0.1 $\mu$ and a high degree of grafting.

Another possibility for a compromise between toughness and surface gloss is shown in German Offenlegungsschrift Nos. 1,745,098 and 1,745,097, where two different ABS-graft polymers are simultaneously incorporated into one SAN-matrix. German Offenlegungsschrift No. 1,745,098 discloses a combination of a graft polymer with an average particle size of $>0.8$ $\mu$ and a graft polymer with an average particle size of $<0.25\mu$, German Offenlegungsschrift No. 1,745,097 discloses a combination of a graft polymer, in which from 5 to 35 parts, by weight, of styrene and acrylonitrile are grafted onto 100 parts, by weight, of base, and a graft polymer with a monomer: spine ratio of 50 to 250 : 100.

In both cases, the required improvement in gloss is at the expense of toughness. By way of comprimise in the first case, only part of the graft polymer has an average particle size of $>0.8\mu$, and in the second case only part of the graft polymer has a G-value of $<0.25$.

The SAN-resin itself also influences the properties of ABS-moulding compositions, because:
1. processibility and surface gloss improve with increasing content of styrene-acrylonitrile copolymer;
2. toughness increases and processibility and surface gloss deteriorate with increasing molecular weight of the SAN-resin.

Accordingly, here a compromise is necessary, too, in order to optimise processibility and surface gloss.

ABS-moulding compositions, which:
1. show simultaneously favourable toughness, gloss and processing behaviour despite a low rubber content and the use of low molecular weight SAN-resin; or
2. despite a large content of small particle size graft polymer and the use of low molecular weight SAN-resin have never before been found.

The present invention relates to ABS-graft polymers with improved processibility and high surface gloss of:
A. 5 to 70 parts, by weight, of a graft polymer obtained by grafting 20 to 60 parts, by weight, of a mixture of styrene and acrylonitrile in a ratio, by weight, of 95 : 5 to 60 : 40 onto 80 to 40 parts, by weight of polybutadiene or a butadiene copolymer with a butadiene content of $> 30\%$, with an average particle diameter of 0.26 to $0.65\mu$ and a grafting degree of 0.15 to 0.7;
B. 0 to 50 parts, by weight, of a graft polymer obtained by polymerising 40 to 60 parts, by weight of a mixture of styrene and acrylonitrile in a ratio by weight, of 95 : 5 to 60 : 40 onto 60 to 40 parts, by weight, of polybutadiene or a butadiene copolymer with a butadiene content of more than 30%, with an average particle diameter of from 0.05 to $0.25\mu$ and a grafting degree of 0.4 to 0.9; and
C. 25 to 95 parts, by weight, of a copolymer of styrene and/or $\alpha$-methyl styrene on the one hand and acrylonitrile on the other hand in a ratio, by weight, of 80:20 to 60 : 40 with an average molecular weight $M_w$ (weight average) of from 50,000 to 200,000 and a molecular heterogeneity [3] U of 4.5 to 1.0; such that
D. the ratios, by weight of styrene (including $\alpha$-methyl styrene if present) to acrylonitrile satisfy the following requirements:

$$\frac{\text{polymerised styrene in (A)}}{\text{polymerised acrylonitrile in (A)}} :$$

$$\frac{\text{polymerised styrene in (C)}}{\text{polymerised acrylonitrile in (C)}} > 1$$

and $$\frac{\text{polymerised styrene in (B)}}{\text{polymerised acrylonitrile in (B)}} :$$

-continued $$\frac{\text{polymerised styrene in } (A)}{\text{polymerised acrylonitrile in } (A)} < 1$$

preferred ABS-graft polymers consist of:

A. 6 to 30 parts, by weight, of a graft polymer of 25 to 50 parts, by weight, of a mixture of styrene and acrylonitrile in a ratio, by weight, of 88 : 12 to 67 : 33 on 75 to 50 parts, by weight, of a butadiene homo- or co-polymer with a butadiene content of ≧70%, an average particle diameter of 0.3 to 0.55μ and a grafting degree of 0.25 to 0.70;

B. 14 to 45 parts by weight, of a graft polymer of 40 to 60 parts, by weight, of a mixture of styrene and acrylonitrile in a ratio, by weight of 88 : 12 to 60 : 40 on 60 to 40 parts, by weight, of a butadiene homo- or co-polymer with a butadiene content of more than 70%, a particle diameter of 0.08 to 0.15μ and a grafting degree of 0.6 to 0.8; and

[3] Molecular heterogeneity $$U = \frac{M_w}{M_n} - 1$$

3 Molecular heterogeneity
$M_w$ weight average of the molecular weight,
$M_n$ numerical average of the molecular weight.

C. 25 to 80 parts, by weight, of a copolymer of styrene and/or α-methyl styrene on the one hand and acrylonitrile on the other hand in a ratio, by weight, of 75: 25 to 60 : 40, with an average molecular weight $M_w$ of 60,000 to 160,000 and a molecular heterogeneity U of 4.0 to 1.0;

such that

D. the ratios, by weight, of styrene (including α-methyl styrene if present) to acrylonitrile satisfy the following requirements.

$$\frac{\text{polymerised styrene in } (A)}{\text{polymerised acrylonitrile in } (A)} : \frac{\text{polymerised styrene in } (C)}{\text{polymerised acrylonitrile in } (C)} \geq 1.3$$

and $$\frac{\text{polymerised styrene in } (B)}{\text{polymerised acrylonitrile in } (B)} : \frac{\text{polymerised styrene in } (A)}{\text{polymerised acrylonitrile in } (A)} \leq 0.8$$

Component (A) is preferably based on a butadiene homo- or copolymer with a comonomer content of ≦ 30% and a gel content of ≧85% (as measured in methylethylketone or toluene). A monomer: spine ratio of 45 : 55 to 35 : 65 is maintained during grafting, the G-value obtained in the grafting reaction is from 0.33 to 0.55, and the grafting monomers have a styrene : acrylonitrile ratio of 90 : 10 to 70 : 30.

The SAN-resin preferably has a styrene-acrylonitrile ratio of 75 : 25 to 66 : 34, a weight average of the molecular weight of 60,000 to 160,000 and a molecular heterogeneity U of <3.

The moulding compositions according to the invention may be produced by known methods. The following methods are mentioned by way of example: emulsion polymerisation and solution polymerisation for preparation of the spine; emulsion polymerisation and suspension polymerisation for preparation of the graft polymers; solutions, suspensions, bulk or emulsion polymerisation for preparation of the SAN-resin.

The process conditions should be such that the critical product parameters defined above are maintained.

The SAN-resin

The SAN-resin preferably consists of copolymers of styrene with acrylonitrile in a ratio, by weight, of 75 : 25 to 66 : 34. The weight average of the molecular weight $M_w$, for example determined by light scattering or by the ultracentrifuge, is preferably from 50,000 to 200,000 and most preferably from 60,000 to 160,000. The number average of the molecular weight $M_n$, as determined, for example, by osmotic measurements, most be such as to yield a molecular heterogeneity:

$$U = \frac{M_w}{M_n} - 1$$

of from 1.0 to 4.5. For example, $M_n$ has to be 27,500 at $M_w$ = 68,000 to yield a molecular heterogeneity U of 1.5

Ways to make SAN-resins with the required property are for example:

1. emulsion polymerisation with continuous addition of emulsifier and monomer in the presence of molecular weight regulators; narrow residence time distribution in the reactor.
2. bulk, solution or emulsion polymerisation to low conversions, followed by monomer recovery and isolation of the solid polymer.

In a preferred embodiment, the SAN-resin contains the monomer units of styrene : acrylonitrile in a ratio by weight, of 75 : 25 to 66 : 34. The styrene may be replaced either completely or partially by α-methyl styrene; copolymers with the ratio, by weight, 69 : 31 are particularly favourable.

The styrene may even be completely or partially replaced by other monomers, or the acrylonitrile content increased to beyond 60%, by weight, in conjunction with other monomers. Accordingly, the following polymers, for example, are also suitable SAN-resins: terpolymers of styrene and acrylonitrile with methyl methacrylate, terpolymers of styrene and acrylonitrile with α-olefins and terpolymers of acrylonitrile with acrylic acid esters and α-olefins.

The styrene may also be replaced by styrenes substituted in the nucleus or side chain, whilst acrylonitrile may be replaced by methacrylonitrile.

In cases where the SAN-resin is prepared by emulsion polymerisation, it is possible to use the conventional emulsifiers, for example alkyl sulphates, alkyl sulphonates, aryl alkyl sulphonates, the alkali metal salts of saturated or unsaturated fatty acids and the alkali metal salts of disproportionated or hydrogenated abietic or tall oil acids. Suitable activators include standard commercial-grade organic and inorganic peroxides, inorganic persulphates and redox systems, i.e., activator systems consisting of an oxidising agent and a reducing agent, heavy metal ions additionally being present in the reaction medium.

The molecular weights may be adjusted with molecular weight regulators, generally relatively long-chain mercaptans or terpinolenes or with α-olefins.

In cases where polymerisation is carried out in solution, aromatic hydrocarbons may be used as solvents and organic peroxides or azo-compounds as activators. No solvents are used in the case of bulk polymerisation. In cases where, in this process, polymerisation is only continued to a certain conversion level, the unreached monomers and solvent may be removed from the solid polymer, for example by evaporation in a screw or, in the case of emulsion polymerisation, even in a thin-layer evaporator.

In cases where the styrene-acrylonitrile copolymers are prepared by suspension polymerisation, it is possible to use the conventional suspension stabilisers, for example polyvinyl alcohol or partially hydrolysed polyvinyl acetate.

The graft bases

In order to comply with the stipulations regarding particle size, highly specific reaction conditions and polymerisation techniques have to be used in the preparation of the graft bases.

For example, a "large particle size" polybutadiene latex with a particle diameter [4] of 0.3 to 0.6μ may be prepared by emulsion polymerisation with a low water : monomer ratio and staggered addition of the emulsifier, whereas, by contrast, a polybutadiene latex with a particle diameter [4] of 0.05 to 0.15 μ requires a high concentration of emulsifier to begin with and a high water : monomer ratio.

[4] $d_{50}$-value, measured in an ultracentrifuge.

In principle, a latex with a particle size of 0.5 to 0.6 μ may also be obtained by particle agglomeration from a fine-particle latex.

The process by which the graft bases are prepared is preferably controlled in such a way that highly cross-linked products are obtained. The gel content should preferably be >85% (as measured in methylethylketone or toluene). In the case of high butadiene contents, this degree of cross-linking may be obtained by continuing polymerisation to high conversion levels or by using crosslinking agents, i.e. polyfunctional monomers, such as divinyl benzene or ethylene glycol dimethacrylate.

According to the invention, the bases of graft polymers (A) and (B) should have an average particle diameter [4] of from 0.26 to 0.65 and from 0.05 to 0.25 μ, respectively.

In principle, solid rubbers which have been obtained from their solutions in organic solvents may also be used for producing the coarse-particle graft polymers. However, it is necessary in this case to carry out the graft polymerisation reaction, for example, in the form of a bulk/suspension polymerisation reaction under such reaction conditions as will produce the critical particle size.

In cases where the spines are prepared by emulsion polymerisation, the emulsifiers, activators and polymerisation auxiliaries used for production of the SAN-resins may again be employed. Before the grafting reaction, the spines should be degassed in order to suppress undesirable crosslinking reactions initiated by unreacted monomer.

It is preferred to use polybutadiene homopolymers or butadiene copolymers with a butadiene content of greater than 60% by weight, as spine in cases where so-called "resin-forming monomer" is used as the comonomer. Where other dienes, for example isoprene, or the lower alkyl esters of acrylic acid are used as comonomers, the butadiene content of the base may be reduced to 30% by weight without incurring any disadvantages in regard to the properties of the moulding composition. In principle, it is also possible to produce the moulding compositions according to the invention from saturated spines, for example ethylene-vinyl acetate copolymers with a vinyl acetate content of less than 50% or ethylene-propylene-diene terpolymers (dienes are non-conjugated, e.g. 1,4-hexadiene, ethylidene norbornene, dicyclopentadiene).

The graft polymers

The graft polymers are obtained by polymerising the graft monomers in the presence of the particular spine using the graft monomer : spine ratios indicated above. The grafting degree, G, may be varied both in dependence upon the type of spine used and in dependence upon the ratio of spine to graft monomer.

Low grafting degrees are obtained where the ratio of spine to graft monomers is high and where the spine has a large average particle diameter. High grafting degrees are obtained where the ratio of spine to graft monomers is $\leq 1 : 1$ and the particle size of the spine is small, in other words the grafting degrees which can be obtained are dependent on the particle size of the graft polymer and the choice of the graft monomers : spine ratio.

For a given spine, the grafting degree can also be adjusted otherwise, for example by adding chain transfer agents, such as long-chain mercaptans and α-olefins, by the type and quantity of suspension stabilisers or emulsifiers, by the type and quantity of activator or even by particular processes, for example the so-called "continuous monomer addition" process.

Grafting reactions generally do not produce 100% grafting. Accordingly, it is also possible by varying the grafting degree to influence the properties of the copolymer (SAN-resin) formed as secondary product during the grafting reaction.

With a graft monomer to spine ratio of > 1 : 1, it is possible to produce part or even all the SAN-resin during the grafting reaction, for example the fine-particle graft polymer may be prepared at the same time as the SAN-resin, provided that the reaction conditions are selected in such a way that both have the properties described above.

The graft polymers can be obtained by various processes, although they are preferably obtained by subjecting the graft monomers to emulsion polymerisation in the presence of a spine obtained by emulsion polymerisation.

It is also possible to suspend a graft polymer obtained by emulsion polymerisation with a small particle size and a low G-value, either in latex form or in the form of a solid polymer, in a SAN-monomer mixture, followed by another grafting reaction in the form of a suspension polymerisation reaction. A graft polymer and the styrene-acrylonitrile copolymer required for the moulding composition may be simultaneously produced in dependence either upon the ratio of the starting graft polymer to the styrene-acrylonitrile monomer mixture or upon the addition of regulator.

In cases where the graft polymers as a whole are produced by emulsion polymerisation, the observations made in reference to production of the resin matrix again apply. Alternatively the large particle size graft polymer can be produced from a soluble rubber, bead polymerisation being carried out after a bulk polymerisation stage followed in turn by phase inversion. The reaction conditions used for the bead polymerisation reaction are the same as those generally known for suspension polymerisation reactions.

It is preferred to produce the graft polymers by emulsion polymerisation.

Graft polymer characteristic

The structure and the chemical composition of the two graft polymers are critical so far as the properties of the moulding composition are concerned. If the limits specified are exceeded, the properties change, for example toughness decreases or processibility deteriorates.

According to the invention, the graft polymer (A) must have a G-value of from 0.15 to 0.70, preferably from 0.25 to 0.65, for an average particle diameter of from 0.26 to 0.65 $\mu$, the side chains grafted on having an average molecular weight (weight average) $M_w$ of from 20,000 to 140,000. Irrespective of the G-value and molecular weight of the side chains grafted on, the composition of the graft monomers must comply with the requirements stipulated above.

Preferably, the G-value of the graft polymer (A) is from 0.35 to 0.55, the molecular weight of the side chains grafted on ($M_w$) is from 40,000 to 80,000; the graft monomers are styrene and acrylonitrile in a ratio of from 90 : 10 to 80 : 20.

The graft polymer (B) must have a G-value of from 0.4 to 0.9, the side chains grafted on having a molecular weight (weight average) $M_w$ of from 15,000 to 60,000.

Preferably, the graft polymer (B) has a G-value of from 0.6 to 0.8, and the side chains grafted on have a molecular weight $M_w$ of from 20,000 to 40,000.

The moulding compositions:

The two graft polymers can be mixed with the SAN-resin in various ways. In cases where, for example, all three components are prepared by emulsion polymerisation, the latices may be mixed.

If, for example, the styrene-acrylonitrile copolymer is prepared by bulk or solution polymerisation and the graft polymer(s) by emulsion polymerisation, mixing has to be carried out in a mixing machine (multiroll stand, mixing extruder or internal kneader).

This is also the case where, for example, two of the components are prepared in one process stage and the third component accumulating in powder or granulate form has to be combined with this component mixture.

The proportion of graft polymers in the moulding composition is limited to at most 75%, by weight, although the proportion of actual graft polymers is generally lower, because not all the monomers have been grafted.

Preferred moulding compositions have the following composition:

| graft polymer | (A): | 6 to 22 parts, by weight; |
|---|---|---|
| graft polymer | (B): | 14 to 38 parts, by weight; |
| SAN-resin | (C) | 40 to 80 parts, by weight; | graft polymer (A) having a G-value of from 0.25 to 0.65 and grafting component (B) a G-value of from 0.65 to 0.80, and the ratio, by weight, of polymerised styrene (including $\alpha$-methyl styrene, if present) to acrylonitrile in (A) and in (C) having to be different.

In cases where the moulding composition contains only two components, i.e., the graft polymer (A) and the SAN-resin (C), the rubber content of the moulding composition is with advantage less than 30% by weight.

Graft polymer combinations in which, graft polymer (A) makes up less than 45% of the aforementioned graft polymers, and graft polymer combinations in which the quantity of spine introduced via graft polymer (A) is less than 50% of the total quantity of spine present in the moulding composition, are particularly preferred.

The moulding compositions according to the invention can have added to them during recovery, further processing and final shaping, the additives required for or expedient to those stages, such as antioxidants, UV-stabilisers, hydroperoxide eliminators, antistatic agents, lubricants, flameproofing agents fillers and colourants.

Final shaping can be carried out in the conventional machines and comprises, for example, injection moulding, sheet extrusion followed by vacuum forming, cold forming of films, the extrusion of tubes and profiles, and calender-processing The definitions used in th description are summarised in the following:

Particle diameter: $d_{50}$-value determined by ultracentrifuge measurement or electron microscopy.

Grafting degree: G-value; actual grafting degree: ratio by (degree of grafting) weight of the monomers actually grafted onto a spine Matrix, resin matrix, SAN-matrix, SAN-resin: Copolymer of styrene and/or $\alpha$-methyl styrene on the one hand and acrylonitrile on the other hand, in which the graft polymer(s) is/are distributed.

Graft polymer: The product of polymerisation of graft monomers in the presence of a spine.

Graft monomers: Styrene ($\alpha$-methyl styrene) and acrylonitrile.

Spine (grafting base; substrate; grafting spine): Butadiene homo- or co-polymer

Molecular heterogeneity $$U = \frac{M_w}{M_n} - 1;$$

$M_w$ = weight average of the molecular weight,
$M_n$ = numerical average of the molecular weight.

Parts in the following Examples are parts by weight unless otherwise stated.

EXAMPLES

A. Preparation of the spines:

The spines are obtained in latex form in accordance with the general formulation by emulsion polymerisation in pressure reactors at from 55° to 75° C. Any particle sizes in the range of from 0.05 to 0.65 $\mu$ may be adjusted by varying the ratio of water to monomer, the quantity of activator or emulsifier added and the type of emulsifier dosage.

| General formulation | Parts, by weight |
|---|---|
| Deionised water | 60.0 – 200.0 |
| Emulsifier[1], total | 1.5 – 7.5 |
| normal(n/1) NaOH | 0.0 – 10.0 |
| Potassium persulphate | 0.25 – 1.0 |
| Butadiene | 30.0 – 100.0 |
| Comonomers | 0.0 – 70.0 |
| n-dodecyl mercaptan | 0.1 – 0.5 |
| Cross-linking agent[2] | 0.0 – 0.5 |

[1]Emulsifiers are preferably the Na-salts of disproportionated abietic acid or of fatty acids and n-alkyl sulphonates.
[2]Divinyl benzene.

Preferred formulation for the preparation of polybutadiene latices:

| | Spine | | |
|---|---|---|---|
| | A-1 | A-2 | A-3 |
| Deionised water | 68.0 | 100.0 | 200.0 |
| Emulsifier[1], total | 2.0 | 2.0 | 5.0 |
| in first stream | 0.5 | 0.5 | 0.5 |
| added in portions afterwards | 1.5 | 1.5 | — |
| Butadiene | 100.0 | 100.0 | 100.0 |
| n-dodecyl mercaptan | 0.4 | 0.4 | 0.4 |
| Final concentration | 0.40 | 0.40 | 0.40 |
| $d_{50}$-value, ultracentrifuge-measurement ($\mu$) | 0.40 | 0.25 | 0.10 |

[1]Na-salt of disproportionated abietic acid. Polymerisation is continued up to a conversion of > 95 % and unreacted butadiene removed from the latex by degassing.

In processed form, the polymers have a gel content of ≧ 85% (determined in methylethylketone or toluene). Latex A-4 was produced in the same way as latex A-1 and latex A-5 in the same way as latex A-3:

| Latex | Monomers (parts by weight) | Particle size $d_{50}$-value, ultracentrifuge measurement ($\mu$) | Final concentration (%) |
|---|---|---|---|
| A-4 | 90 Butadiene + 10 Styrene | 0.38 | 59.3 |
| A-5 | 80 Butadiene + 20 Styrene | 0.12 | 32.5 |

The following latex was prepared in the same way as latex A-3 using 2.5 part, by weight, of Na-alkyl sulphonate (n-alkyl radical $C_{12}$-$C_{18}$):

| Latex | Monomers (parts, by weight) | Particle size $d_{50}$-value, ultracentrifuge measurement ($\mu$) | Final concentration (%) |
|---|---|---|---|
| A-6 | 30 Butadiene + 70 Butyl-acrylate | 0.08 | 32.5 |

B. Preparation of the graft polymers :

The graft polymers were prepared by emulsion polymerisation in accordance with the general formulations:

| General formulation | Parts, by weight |
|---|---|
| Spine (solid polymer) | 80 – 40 |
| Deionised water | 150 – 200 |
| Emulsifier[1] | 0.0 – 5.0 |
| Graft monomers | 20 – 60 |
| Potassium persulphate | 0.3 – 1.0 |
| Tert.-dodecyl mercaptan | 0.0 – 1.0 |

[1]Preferably the alkali salts of disproportionated abietic acid or n-alkyl sulphonates Polymerisation temperature: 60 – 75° C
Apparatus: standard apparatus equipped with stirrer, condenser and measuring vessels.
Polymerisation process governed by grafting degrees to be adjusted.
Batch operation or continuous operation with emulsifier and/or monomer run in continuously.

| Preferred formulation | I g | II g |
|---|---|---|
| Spine Latex A 3 (35.4%) | 2120 | 2260 |
| Deionised water | 1630 | 540 |
| Solid polymer in latex A 3 | 750 | 800 |
| Na-alkyl sulphonate | 15 | 8 |
| Potassium persulphate | 7.5 | 3 |
| Styrene + acrylonitrile (ratio, by weight, 70 : 30) | 750 | 200 |

The formulations are quoted in parts by weight.

| | I | II |
|---|---|---|
| Deionised water | 200 | 200 |
| Spine (solid) | 50 | 80 |
| Na-alkyl sulphonate | 1.0 | 0.8 |
| Potassium persulphate | 0.5 | 0.3 |
| Styrene + acrylonitrile | 50 | 20 | some of the water emanating from the latex and the rest being added.

The spine is initially introduced in latex from and the potassium persulphate introduced in solution in a relatively large part of the deionised water. The solution of the emulsifier in 25 parts, by weight, of deionised water and the monomer mixture are run in through dropping funnels. The run-in time is 4 hours in each case, the reaction temperature 65° C. The polymerisation conversion should amount to more than 97%.

The following graft polymers were prepared in accordance with this specification:

Graft Polymers

| Name | Spine name | Composition of the spine of monomer units in %, by weight,[1] | | | Particle size $d_{50}$-value $\mu$ | Graft polymer Ratio, by weight, of spine to graft monomer | Graft monomer ratio, by weight, of styrene to acrylonitrile | G-value |
|---|---|---|---|---|---|---|---|---|
| | | Bu | S | BA | | | | |
| B-1 | A-3 | 100.0 | — | — | 0.1 | 50 : 50 | 70 : 30 | 0.72 |
| B-2 | A-3 | 100.0 | — | — | 0.1 | 80 : 20 | 70 : 30 | 0.16 |
| B-3 | A-1 | 100.0 | — | — | 0.4 | 60 : 40 | 88 : 12 | 0.49 |

Graft Polymers-continued

| Name | Spine name | Composition of the spine of monomer units in %, by weight,[1] | | | Particle size $d_{50}$-value $\mu$ | Graft polymer Ratio, by weight, of spine to graft monomer | Graft monomer ratio, by weight, of styrene to acrylonitrile | G-value |
|---|---|---|---|---|---|---|---|---|
| | | Bu | S | BA | | | | |
| B-4 | A-1 | 100.0 | — | — | 0.4 | 60 : 40 | 72 : 28 | 0.45 |
| B-5 | A-1 | 100.0 | — | — | 0.4 | 70 : 30 | 88 : 12 | 0.34 |
| B-6 | A-4 | 90.0 | 10 | — | 0.38 | 70 : 30 | 80 : 20 | 0.36 |
| B-7 | A-2 | 100.0 | — | — | 0.25 | 55 : 45 | 88 : 12 | 0.51 |
| B-8 | A-5 | 80.0 | 20 | — | 0.12 | 50 : 50 | 50 : 50 | 0.72 |
| B-9 | A-1 | 100.0 | — | — | 0.40 | 80 : 20 | 80 : 20 | 0.20 |
| B-10 | A-6 | 30.0 | — | 70 | 0.08 | 50 : 50 | 70 : 30 | 0.80 |

[1]Bu = butadiene units, S = Styrene units, BA = butyl acrylate units

C) Preparation of the SAN-copolymers

C 1 Emulsion polymerisation

Apparatus:

Reactor cascade of 4 glass reactors each with a capacity of 0.5 litres. Each reactor is thermostatically controlled and equipped with a stirrer, thermometer, condenser and an overflow tube which leads from the bottom of the first reactor to the upper edge of the following reactor.

Reaction:

The following streams are introduced through metering pumps into reactor 1:
a. 444 cc/h of a solution of 2.0 parts, by weight, of the Na-salt of a disproportionated abietic acid and 0.3 parts, by weight, of potassium persulphate in 150 parts, by weight, of deionised water;
b. 338 cc/h of a mixture of 70 parts, by weight, of styrene, 30 parts, by weight, of acrylonitrile and 0.3 parts, by weight, of tert.-dodecyl mercaptan.

The polymerisation temperature is 65° C and the average residence time 2.5 h. The conversion is in excess of 95%.

Copolymer characteristic:

The viscosity average of the molecular weight $M\eta$ (weight average) amounts to 97,000 (as measured in DMF at 20° C), and the molecular heterogeneity U amounts to 1.6 for a numerical average of the molecular weight $M_n$ of 37,000.

C 2 Bulk polymerisation

Apparatus:

36 litre stainless steel-reactor equipped with a wall-sweeping anchor stirrer. Monomer inlet tube at the bottom of the reactor; product outlet tube at the upper end of the reactor; condenser and thermometer.

Polymerisation:

57 l/h of a mixture of 75 parts, by weight, of styrene 25 parts, by weight of acrylonitrile and 0.1 part by weight, of tert.-dodecyl mercaptan are "run" into the reactor through a metering pump. This corresponds to an average residence time of 0.63 h. The polymerisation temperature is adjusted to 140° C. Polymerisation is continued to a conversion of 25%. The polymer solution formed is continuously removed and passed through a thin-layer evaporator, the monomer recovered is returned to the reaction and the polymer isolated is removed through a discharge extruder.

Copolymer characteristic:

The product obtained by the method described above has the following characteristics:

$M \eta \sim 86,000; M_n \sim 42,000; U = 1.2$

D Production of the moulding compositions

D 1) By common precipitation of the latices when all the components are prepared by emulsion polymerisation and accumulate in the form of latices.

Corresponding latices containing:
$x$ parts, by weight, of graft polymer (A)
$y$ parts, by weight, of graft polymer (B)
$z$ parts, by weight, of styrene-acrylonitrile copolymer (C) are mixed and the mixture coagulated with magnesium sulphate following the addition of 1.0 parts, by weight, (based on 100 parts, by weight, of solid polymer) of a phenolic antioxidant (2,6-di-tert.-butyl-p-cresol), through a 25% oil-in-water emulsion. After washing, the resulting powder is dried at 70° C in a vacuum drying cabinet.

D 2) By mixing powder and granulate when, for example, the SAN-resin is in the form of a granulate (bulk polymerisation) and the two graft polymers are in the form of powders (emulsion polymerisation) and working-up in accordance with D 1), the components are mixed at from 140° to 200° C in a double-screw extruder or in an internal kneader following the addition of 1.5 parts (per 100 parts of polymer) of the bis-stearyl amide of ethylene diamine, the resulting moulding composition is run off in band form and subsequently granulated.

E) Production of the test specimens

E 1) From the moulding composition in powder form

Following the addition of 1.5 parts, by weight, of the bis-stearyl amide of ethylene diamine (1.5 parts, by weight, /100 parts, by weight, of polymer), the powder is processed into a rough sheet on a two-roll stand and the rough sheet thus obtained granulated. Standard small test bars are subsequently injection-moulded from the granulate at 220° C.

E 2 From the moulding composition in granulate form by injection moulding as in E 1).

F) Test methods

F 1)

The DIN standard methods for determining notched impact strength, impact strength and hardness, flexural strength and dimensional stability to heat according to Vicat.

F 2)

The melt index according to DIN 53 753, expressed in g/10 minutes (temperature 220° C, 10 kp load).

F 3)

A visual test for determining gloss, 2% by weight, of carbon black and 2%, by weight, of the bis-stearyl amide of ethylene diamine are added to the moulding composition, and a test specimen (spring cup) produced by injection moulding under different pressures at 240° C. The underneath of the test specimen is substantially flat, whilst its upper surface has a number of stiffenig ribs of different height.

It is possible, on the flat side of the test specimen, to detect the plate in which the ribs are situated on the other side because the material "contracts" there and because the gloss differs from that of the other areas.

The injection pressure is first changed in such a way that no contractions occur, so that only differences in gloss are observed.

A test specimen of a styrene-acrylonitrile copolymer with a molecular weight of approximately 200,000 (as determined by measuring viscosity in DMF at 20° C) has completely identical colour shades and gloss retention over its entire surface and serves as standard. This gloss level is denoted as H.

G corresponds to a barely recognisable difference in gloss,

F corresponds to a distinctly recognisable difference in gloss,

E corresponds to an average difference in gloss,

D corresponds to a marked difference in gloss,

C corresponds to a very marked difference in gloss.

Gloss level C is generally reached in standard commercial grade ABS-polymers.

The test specimens can be classified according to their gloss levels by various people without any argument whatever. Visual assessment is as reliable as optical measurements (interference measurements).

EXAMPLES 1 to 4:

Using:
a. graft polymer B-3;
b. graft polymer B-1;
c. a styrene-acrylonitrile copolymer of 70 parts of styrene and 30 parts of acrylonitrile, prepared in accordance with C-1 with the copolymer characteristics $M_\eta = 77,000$, $U = 1.6$, $M_n = 32,000$;
d. a styrene-acrylonitrile copolymer of 66 parts of styrene and 34 parts of acrylonitrile, prepared in accordance with C-1, with the following characteristic: $M_\eta = 90,000$, $U = 2.1$, $M_n = 38,000$, ACN-content = 32.1%, moulding compositions of the following compositions were prepared in accordance with D-1;

| Example | 1 | 2 | 3 | 4 |
|---|---|---|---|---|
| Graft polymer B-3(parts) | 29.6 | 12.6 | 12.6 | 16.5 |
| Graft polymer B-1(parts) | — | 20.0 | 20.0 | 28.6 |
| Styrene-acrylonitrile copolymer 70 : 30(parts) | 70.8 | 67.4 | — | — |
| Styrene-acrylonitrile copolymer 66 : 34(parts) | — | — | 67.4 | 54.9 |

The data quoted in Table 1 are obtained after further processing in accordance with E-1 and testing in accordance with F-1 to F-3.

Table I

| Properties of the moulding compositions according to the invention | | | | | |
|---|---|---|---|---|---|
| Example | | 1 | 2 | 3 | 4 |
| Notched impact strength in kp cm/cm² DIN 53 543 | 20° C | 13.0 | 15.0 | 17.0 | 21.5 |
|  | −40° C | 5.0 | 6.5 | 7.0 | 10.3 |
| Impact strength in kp cm/cm² DIN 53 543 | 20° C | unbr.[1] | unbr.[1] | unbr.[1] | unbr.[1] |
|  | −40° C | 71 | 85 | 90 | 100 |
| Ball indentation hardness kp/cm² DIN 53 546 |  | 910 | 900 | 880 | 700 |
| Melt index g/10 mins DIN 53 753 |  | 15 | 19 | 18 | 11 |
| Gloss assessment scale H–C |  | E | H | G | E |

[1] unbr. means that 10 out of 10 test specimens remained unbroken after impact-strength testing. As can be seen from Table I, the moulding compositions according to the invention combine high surface gloss and extreme hardness with favourable toughness properties.

COMPARISON EXAMPLES A – D

These Examples demonstrate the superiority of the moulding compositions according to the invention.

1. In Example 1, graft polymer B-3 was replaced by graft polymer B-4 and the SAN-resin component retained (Comparison Example A);
2. In Example 1, graft polymer B-3 was retained and the SAN-resin component replaced by a styrene-acrylonitrile copolymer which was prepared in accordance with C-2 and which had the following characteristic: $M_\eta = 192,000$, $U = 1.9$, styrene: acrylonitrile = 76 : 24 (Comparison Example B);
3. In Example 2, graft polymer B-3 was replaced by graft polymer B-4 and the remaining composition retained (Comparison Example C)
4. In Example 3, the large particle size graft polymer B-3 was completely replaced by the small particle size graft polymer B-1, based on the same total rubber content.

Following product compositions:

| Comparison Examples | A | B | C | D |
|---|---|---|---|---|
| Graft polymer B-3(parts) | — | 29.2 | — | — |
| Graft polymer B-4(parts) | 29.2 | — | 12.6 | — |
| Graft polymer B-1(parts) | — | — | 20.0 | 35.6 |
| SAN-copolymer (parts) | 70.8 | 70.8 | 67.4 | 65.0 |

The data set out in Table II are obtained after further processing in accordance with E-1 and E-2 and testing in accordance with F-1, F-2 and F-3.

Table II

| Comparison Examples | Properties of the Comparison Examples | A | B | C | D |
|---|---|---|---|---|---|
| Notched impact strength in kp cm/cm² DIN 53 543 | 20° C | 10.5 | 16.0 | 14.0 | 3.4 |
| | −40° C | 4.0 | 6.9 | 6.0 | 1.9 |
| Impact strength in kp cm/cm² DIN 53 543 | 20° C | unbr. | unbr. | unbr. | 52 |
| | −40° C | 65 | 85 | 95 | 38 |
| Ball indentation hardness kp/cm² DIN 53 546 | | 920 | 890 | 900 | 890 |
| Melt index g/10 mins. DIN 53 753 | | 14 | 8.5 | 19 | 9.0 |
| Gloss assessment scale H–C | | D | B | H | H |

EXAMPLE 5

10.7 parts of graft polymer B-5;
20.0 parts of graft polymer B-1; and
69.3 parts of the SAN-copolymer described in Example 3.

EXAMPLE 6

10.7 parts of graft polymer B-3;
17.2 parts of graft polymer B-1; and
72.1 parts of a styrene-acrylonitrile copolymer prepared in accordance with the general process conditions C-1 and having an M$\eta$ -value of 70,000 and a U-value of 1.5.

EXAMPLE 7

10.7 parts of graft polymer B-6;
20.0 parts of graft polymer B-8; and
69.3 parts of a styrene-acrylonitrile copolymer, obtained by the bulk polymerisation in accordance with C-2 of a styrene-acrylonitrile(66:34) monomer mixture: M $\eta$ = 70,000; molecular heterogeneity U: 1.2.

EXAMPLE 8

13.7 parts of graft polymer B-7;
20.0 parts of graft polymer B-1; and
66.3 parts of the styrene-acrylonitrile copolymer specified in Example 7.

The following basic data were obtained after further processing in accordance with E-1 and E-2 and testing in accordance with F-1 to F-3;

The data quoted in Table III, column heading 9, were obtained after latex mixing in accordance with D-1, working-up in accordance with E-1 and testing in accordance with F-1 to F-3.

We claim:

1. A moulding composition comprising:
   A. 5 to 70 parts, by weight of a graft polymer of from 20 to 60 parts, by weight, of a mixture of styrene and acrylonitrile in a weight ratio of from 95 : 5 to 60 : 40 on from 80 to 40 parts, by weight, of a butadiene homo- or co-polymer having a butadiene content of at least 30%, an average particle diameter of from 0.26 to 0.65 $\mu$ and a grafting degree of from 0.15 to 0.7;
   B. 0 to 50 parts, by weight, of a graft polymer obtained by polymerising from 40 to 60 parts, by weight, of a mixture of styrene and acrylonitrile in a weight ratio of from 95 : 5 to 60 : 40 onto from 60 to 40 parts, by weight, of a butadiene homo- or co-polymer having a butadiene content of at least 30%, and average particle diameter of from 0.05 to 0.25 $\mu$ and a grafting degree of from 0.4 to 0.9; and
   C. 25 to 95 parts, by weight, of a copolymer of styrene and/or $\alpha$-methyl styrene with acrylonitrile in a weight ratio of from 80 : 20 to 60 : 40 having an average molecular weight of from 50,000 to 200,000 and a molecular heterogeneity of from 4.5 to 1.0; such that
   D. the ratios, by weight, of styrene (including $\alpha$-methyl styrene, if present) to acrylonitrile satisfy the following conditions:

Table III

| Example | Properties of the product composition according to Example | 5 | 6 | 7 | 8 | 9 |
|---|---|---|---|---|---|---|
| Notched impact strength kp cm/cm² DIN 53 543 | 20° C | 15.6 | 12.5 | 18.4 | 16.0 | 17.0 |
| | −40° C | 6.7 | 5.7 | 8.5 | 9.0 | 6.1 |
| Impact strength kp cm/cm² DIN 53 543 | 20° C | unbr. | unbr. | unbr. | unbr. | unbr. |
| Ball indentation hardness kp/cm² DIN 53 546 | | 898 | 950 | 881 | 878 | 860 |
| Melt index g/10 mins DIN 53 753 | | 17 | 27 | 20 | 21 | 17 |
| Gloss assessment scale H–C | | G | H | G | G | G |

EXAMPLE 9

12.5 parts of graft polymer B-9;
15.0 parts of graft polymer B-10; and
72.5 parts of a styrene-acrylonitrile copolymer obtained in accordance with C-1 with a styrene-acrylonitrile ratio of 69 : 31; M $\eta$ = 100,000; molecular heterogeneity U = 2.5.

$$\frac{\text{polymerised styrene in (A)}}{\text{polymerised acrylonitrile in (A)}} :$$

$$\frac{\text{polymerised styrene in (C)}}{\text{polymerised acrylonitrile in (C)}} > 1$$

and $$\frac{\text{polymerised styrene in (B)}}{\text{polymerised acrylonitrile in (B)}} :$$

-continued
$$\frac{\text{polymerised styrene in (A)}}{\text{polymerised acrylonitrile in (A)}} < 1$$

2. A composition as claimed in claim 1 comprising:
A. 5 to 70 parts, by weight, of a graft polymer of from 25 to 50 parts, by weight, of a mixture of styrene and acrylonitrile in a weight ratio of from 88 : 12 to 60 : 40 on from 75 to 50 parts, by weight, of a butadiene homo- or co-polymer having a butadiene content of not less than 70%, an average particle diameter of from 0.26 to 0.55 μ and a grafting degree of from 0.25 to 0.7;
B. 0 to 50 parts, by weight, of a graft polymer or from 60 to 40 parts, by weight, of a mixture of styrene and acrylonitrile in a weight ratio of from 88 : 12 to 60 : 40 on from 40 to 60 parts, by weight, of a butadiene homo- or co-polymer having a butadiene content of not less than 70%, an average particle diameter of from 0.08 to 0.15 μ and a grafting degree of from 0.6 to 0.9; and
C. 25 to 90 parts, by weight, of a copolymer of styrene and/or α-methyl styrene with acrylonitrile in a weight ratio of from 75 : 25 to 60 : 40 having an average molecular weight of from 50,000 to 200,000 and a molecular heterogeneity of from 4.0 to 1.0; such that
D. the ratios, by weight of styrene (including α-methyl styrene, if present) to acrylonitrile satisfy the conditions:

$$\frac{\text{polymerised styrene in (A)}}{\text{polymerised acrylonitrile in (A)}} :$$

$$\frac{\text{polymerised styrene in (C)}}{\text{polymerised acrylonitrile in (C)}} > 1$$

and $$\frac{\text{polymerised styrene in (B)}}{\text{polymerised acrylonitrile in (B)}} :$$

$$\frac{\text{polymerised styrene in (A)}}{\text{polymerised acrylonitrile in (A)}} < 1$$

3. A composition as claimed in claim 1 comprising:
A. 6 to 30 parts, by weight of a graft polymer of from 20 to 60 parts, by weight, of a mixture of styrene and acrylonitrile in a weight ratio of from 88 : 12 to 60 : 40 on from 80 to 40 parts, by weight, of a butadiene homo- or co-polymer having a butadiene content of not less than 30%, an average particle diameter of from 0.26 to 0.65 μ and a grafting degree of from 0.25 to 0.7;
B. 14 to 45 parts, by weight, of a graft polymer of from 60 to 40 parts, by weight, of a mixture of styrene and acrylonitrile in a weight ratio of from 90 : 10 to 60 : 40 on 40 to 60 parts, by weight, of a butadiene homo- or co-polymer having a butadiene content of not less than 30%, an average particle diameter of from 0.08 to 0.25 μ and a grafting degree of from 0.6 to 0.9; and
C. 25 to 80 parts, by weight of a copolymer of styrene and/or α-methyl styrene with acrylonitrile in a weight ratio of from 80 : 20 to 60 : 40 in a weight ratio of from 80 : 20 to 60 : 40 having an average molecular weight of from 50,000 to 200,000 and a molecular heterogeneity of from 4.5 to 1.0; such that D. the ratios, by weight, of styrene (including α-methyl styrene if present) to acrylonitrile satisfy the conditions:

$$\frac{\text{polymerised styrene in (A)}}{\text{polymerised acrylonitrile in (A)}} :$$

$$\frac{\text{polymerised styrene in (C)}}{\text{polymerised acrylonitrile in (C)}} > 1$$

and $$\frac{\text{polymerised styrene in (B)}}{\text{polymerised acrylonitrile in (B)}} :$$

$$\frac{\text{polymerised styrene in (A)}}{\text{polymerised acrylonitrile in (A)}} < 1$$

4. A composition as claimed in claim 3 comprising:
A. 6 to 30 parts, by weight, of a graft polymer of from 20 to 50 parts, by eight, of a mixture of styrene and acrylonitrile in a weight ratio of from 88 : 12 to 60 : 40 on from 75 to 50 parts, by weight, of a butadiene homo- or co-polymer having a butadiene content of not less than 70%, an average particle diameter of from 0.3 to 0.55 μ and a grafting degree of from 0.25 to 0.7;
B. 14 to 45 parts, by weight, of a graft polymer of from 60 to 40 parts, by weight, of a mixture of styrene and acrylonitrile in a weight ratio of from 88 : 12 to 60 : 40 on from 40 to 60 parts, by weight, of a butadiene homo- or co-polymer having a butadiene content of not less than 70%, an average particle diameter of from 0.08 to 0.15 μ and a grafting degree of from 0.6 to 0.9; and
C. 25 to 80 parts, by weight, of a copolymer of styrene and/or α-methyl styrene with acrylonitrile in a weight ratio of from 75 : 25 to 60 : 40 having an average molecular weight of from 60,000 to 160,000 and a molecular heterogeneity of from 4.0 to 1.0; such that
D. the ratios, by weight, of styrene (including α-methyl styrene if present) to acrylonitrile satisfy the conditions:

$$\frac{\text{polymerised styrene in (A)}}{\text{polymerised acrylonitrile in (A)}} :$$

$$\frac{\text{polymerised styrene in (C)}}{\text{polymerised acrylonitrile in (C)}} > 1$$

and $$\frac{\text{polymerised styrene in (B)}}{\text{polymerised acrylonitrile in (B)}} :$$

$$\frac{\text{polymerised styrene in (A)}}{\text{polymerised acrylonitrile in (A)}} < 1$$

5. A composition as claimed in claim 4 comprising:
A. 6 to 30 parts, by weight, of a graft polymer of from 35 to 50 parts, by weight, of a mixture of styrene and acrylonitrile in a weight ratio of from 88 : 12 to 60 : 40 on from 75 to 50 parts, by weight, of a butadiene homo- or co-polymer having a butadiene content of not less than 70%, an average particle diameter of from 0.3 to 0.55 μ and a grafting degree of from 0.35 to 0.6;
B. 14 to 45 parts, by weight, of a graft polymer of from 60 to 40 parts, by weight, of a mixture of styrene and acrylonitrile in a weight ratio of from 88 : 12 to 60 : 40 on from 40 to 60 parts, by weight, of a butadiene homo- or co-polymer having a butadiene content of more than 70%, an average particle diameter of from 0.08 to 0.15 μ and a grafting degree of from 0.6 to 0.8; and C. 25 to 80 parts, by weight, of a copolymer of styrene and/or α-methyl styrene with acrylonitrile in a weight ratio of from 75 : 25 to 60 : 40, having an average molecular weight of from 60,000 to 160,000 and a molecular heterogeneity of from 3.0 to 1.0; such that D. the ratios, by weight, of styrene (including α-methyl styrene, if present) to acrylonitrile satisfy the conditions:

$$\frac{\text{polymerised styrene in (A)}}{\text{polymerised acrylonitrile in (A)}} :$$

$$\frac{\text{polymerised styrene in (C)}}{\text{polymerised acrylonitrile in (C)}} > 1$$

and $$\frac{\text{polymerised styrene in (B)}}{\text{polymerised acrylonitrile in (B)}} :$$

$$\frac{\text{polymerised styrene in (A)}}{\text{polymerised acrylonitrile in (A)}} < 1$$

6. A composition as claimed in claim 1 in which the graft polymer component (A) contains a spine having a particle diameter of from 0.26 to 0.65 μ and a gel content of more than 85%; graft polymer component (B) contains a spine having a particle diameter of from 0.05 to 0.25 μ and a gel content of more than 85%, and the grafted monomer composition of graft component (A) differs in its chemical composition from the chemical composition of the SAN-resin matrix.

7. A composition as claimed in claim 1 in which the SAN-copolymer (C) has a styrene and/or α-methyl styrene to acrylonitrile ratio of from 75 : 25 to 66 : 34, a weight average of the molecular weight of from 50,000 to 200,000 and molecular heterogeneity of from 4.5 to 1.0.

8. A composition as claimed in claim 4 in which the ratio of the total quantity of rubber introduced by graft polymer components (A) and (B) is selected in such a way that the quantity of rubber introduced by graft polymer component (A) is always less than 45% of the rubber total.

* * * * *